United States Patent
Newman, Jr. et al.

[15] 3,673,050

[45] June 27, 1972

[54] LAMINATE OF A BARRIER LAYER ENCLOSED IN RIGID HIGH DENSITY POLYOLEFIN LAYERS

[72] Inventors: Ritchey O. Newman, Jr., Midland; Walter J. Schrenk, Bay City, both of Mich.

[73] Assignee: Dow Chemical Company, Midland, Mich.

[22] Filed: Feb. 5, 1970

[21] Appl. No.: 9,068

[52] U.S. Cl..............................161/165, 161/253, 161/254, 161/255, 161/256, 260/29.6 RB, 260/29.7 UA
[51] Int. Cl. ................B32b 27/08, B32b 27/30, B32b 27/32
[58] Field of Search..................161/247, 252, 256, 255, 254, 161/165

[56] References Cited

UNITED STATES PATENTS 3,524,795   8/1970   Peterson ..........................161/254 X

OTHER PUBLICATIONS

" Modern Plastics Encyclopedia 1967," The September Issue of Modern Plastics, 1964, McGraw-Hill, New York The Frontispiece and pages 234, 237

*Primary Examiner*—Robert F. Burnett
*Assistant Examiner*—C. B. Cosby
*Attorney*—Griswold and Burdick, Merlin B. Davey and Lloyd E. Hessenaur, Jr.

[57] ABSTRACT

This invention provides economical multi-layer sheets that combine high barrier layers with thick layers of rigid high density polyolefins.

16 Claims, No Drawings

LAMINATE OF A BARRIER LAYER ENCLOSED IN RIGID HIGH DENSITY POLYOLEFIN LAYERS

BACKGROUND OF THE INVENTION

Rigid formed containers are of many types and sizes and are formed, filled and closed by a number of methods. When made from sheet of any single polymer or copolymer they are limited to the characteristics of that material.

SUMMARY OF THE INVENTION

This invention provides multi-layer sheets for making rigid formed containers. More particularly, the invention provides five-layer rigid sheets comprising an inner barrier layer, juxtaposed glue layers on both sides of the barrier layer and outer layers of rigid polyolefins, said outer layers having an ASTM D-790 flexural modulus of at least 150,000 psi and a thickness of at least 10 mils. The sheet materials advantageously have a total thickness of 30 to 300 mils.

The outer polyolefin layers can be from 10 to 40 mils thick and are preferably from about 25 to 30 mils thick.

By "polyolefin" is meant polyethylene, polypropylene, resinous copolymers of ethylene and propylene and copolymers of ethylene and/or propylene with minor proportions of other olefinically unsaturated monomers.

A wide variety of barrier materials may be employed in the central layer of films in accordance with the present invention. Particularly suited as barrier layers are combinations of vinylidene chloride polymers, vinyl chloride polymers, vinylidene fluoride polymers and extrudable mixtures thereof. The requirement for the central layer is that the material be extrudable within a sheath of another polymer and that the composition have the desired gas and moisture vapor transmission barrier characteristics. Particularly advantageous and beneficial are extrudable compositions of vinylidene chloride polymers, wherein the polymers contain at least about 70 weight percent vinylidene chloride, the remainder being one or more olefinically unsaturated monomers copolymerizable therewith. Suitable vinylidene chloride polymers are prepared utilizing such comonomers as methyl, ethyl, isobutyl, butyl, octyl and 2-ethylhexyl acrylates and methacrylate; phenyl methacrylate, cyclohexyl methacrylate, p-cyclo-hexylphenyl methacrylate, chloroethyl methacrylate, 2-nitro-2-methylpropyl methacrylate, and the corresponding esters of acrylic acid, methyl alpha-chloro-acrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbozole, isopropenyl acetate, acrylamide, methacrylamide or monoalkyl substitution products thereof, phenyl vinyl ketone, diethyl fumarate, diethyl maleate, methylene diethyl malenate, dichlorovinylidene fluoride, dimethyl itaconate, diethyl itaconate, dibutyl itaconate, vinyl pyridine, maleic anhydride and allyl glycidyl ether. Commercially available light stabilizers may also be incorporated in the vinylidene chloride material such as tertiary-butyl salol. Other barrier compositions which may be used with benefit in films in accordance with the present invention are vinyl chloride polymers which contain a predominant amount of vinyl chloride therein, and beneficially, fluorocarbon polymers, fluorohydrocarbon polymers and fluorohalohydrocarbon polymers may also be used with benefit. Such materials as polyvinyl chloride, polyvinylidene fluoride, chlorinated polyethylene and polymers of such materials as vinylidene fluoride, vinylidene fluoride and chlorotrifluoroethylene, chlorotrifluoroethylene and vinylidene fluoride, chlorotrifluoroethylene and vinyl chloride, chlorotrifluoroethylene-vinylidene fluoride and tetrafluoroethylene and the like. Generally, for economic reasons, the vinylidene chloride polymers are employed, as they are most readily available at relatively low cost.

Beneficially, in the extrusion of the vinylidene polymers, it is frequently advantageous and beneficial to incorporate therein a minor portion of a plasticizer, oftentimes a heat stabilizer and a light stabilizer. Such additives are well known in the art and generally are found advantageous in that the temperature required for the extrusion is substantially reduced and the probability of decomposition of the polymer in the extruder is lowered. Typical plasticizers which are employed in the vinylidene or saran combinations are acetyl tributyl citrate, epoxidized soybean oil (commercially available under the trade designation of Paraplex G-60), dibutyl sebacate, and polymeric plasticizers such as, for example, certain copolymers of ethylene and vinyl acetate.

The barrier layer can be from 0.5 to 35 mils in thickness and is most advantageously from 1.5 to 20 mils thick.

The adhesive layer may vary in thickness from 0.2 to 5.0 mils, however, generally the preferred adhesive layer thickness is about 2.0 mils. Oftentimes the strength of the bond between the inner or core layer and the outer or surface layer increases slowly as the thickness of the adhesive layer is increased, and generally little or no increase in the bond strengths occurs after the thickness of the bonding layer has reached about 2.0 mil.

A rigid multilayer sheet in accordance with the present invention has a total combined thickness of more than 20 mils. For example, taking the minimum thicknesses herein disclosed for the barrier layer at 0.5 mils, two adhesive layers at 0.4 mils (0.2 mils each) and two outer layers at 20.0 mils (10.0 mils each), a total thickness of 20.9 mils is obtained.

A wide variety of polymers and polymeric compositions are useful to increase the adhesion between the polyolefin outer layer and the inner barrier layer. Suitable polymers or polymeric compositions are readily selected by determining the bonding strength of the composition being evaluated by forming a two-layer extrusion. The bond strength of the two-layer laminate is readily determined by conventional peel strength tests.

Adhesives which may be employed are copolymers of ethylene and vinyl acetate, advantageously in proportions of from 14 weight percent to 40 weight percent vinyl acetate with from 86 weight percent to 60 weight percent ethylene, copolymers of ethylene and ethylacrylate advantageously in proportions of from 20 to 30 weight percent ethylacrylate with from 80 to 70 weight percent ethylene, copolymers of ethylene with isobutyl acrylate, advantageously in proportions of from 20 to 30 weight percent isobutyl acrylate with from 80 to 70 weight percent of ethylene and chlorinated polyethylene, advantageously containing from 15 to 40 weight percent chlorine. A particularly preferred adhesive is a block copolymer of styrene and butadiene. Blends of such adhesive materials may also be employed.

The sheets of this invention are ideally suited for making containers of a variety of forms for products that are sensitive to oxygen, carbon dioxide or moisture, products that have an elusive fragrance that is desirably retained, products that may pick up unwanted odors from the environment or products that contain highly volatile components. Products advantageously packaged in the sheet material of this invention include, for example, cheese, butter, steroids, various medicines, dried foods and shelf stable meat products such as corned beef hash, chili con carne and the like.

The invention is further illustrated by the following examples:

EXAMPLE 1

A five layer sheet was prepared by the coextrusion of outer layers of polyethylene having a melt index of 6.0, a density of 0.967 and a flexural modulus of 230,000, a core layer comprising 96 parts by weight of a copolymer of 85 weight percent vinylidene chloride and 15 weight percent vinyl chloride, 3 parts by weight of a copolymer of 67 weight percent ethylene and 33 weight percent vinyl acetate having a melt index of 22-28 and a density at 23° C. of 0.957 and 1 part by weight of tetrasodium pyrophosphate and glue layers comprising an ethylene-vinyl acetate copolymer containing 28 weight percent vinyl acetate (sold under the trade designation Elvax 260) and having a melt index of 6 and a density of 0.954. The outer layers were 14.6 mils thick, the core layer 6.4 mils thick and the glue layers each 2.2 mils thick.

The moisture transmission rate of this sheet was 0.0013 grams/100 sq. in. in 24 hours and the oxygen transmission rate was 0.025 cc/100 sq. in. in 24 hours at 1 atmosphere.

EXAMPLE 2

The procedure of Example 1 was repeated employing a barrier layer having a thickness of 6.8 mils and the same composition as in Example 1, the glue layers were each 3.6 mils thick and comprised the ethylene-vinyl acetate copolymer employed in Example 1, and the outer layers were each 23.0 mils thick and comprised a copolymer of ethylene and propylene (sold under the trade designation Avisun TD–319) having a density of 0.9 and a melt flow rate of 9 grams per 10 minutes by ASTM method D 1230–62–T.

The oxygen transmission rate of this sheet was about 0.01 cc per 100 sq. in. per 24 hours at 1 atmosphere and the moisture transmission rate was less than 0.006 g/100 square inches in 24 hours.

EXAMPLE 3

The procedure of Example 1 was repeated except that the outer layers were each 34.5 mil thick polyethylene made by Ziegler catalysis and having a density of 0.959, a melt index of 0.5 and a flexural modulus of 170,000. The core layer was 7 mils thick and the glue layers were each 2.0 mils thick. (The core and glue layers employed were the same used in Example 1). The oxygen transmission rate was about 0.01 cc per 100 sq. in. in 24 hours at 1 atmosphere and the moisture transmission rate was less than 0.003 g/100 sq. in./24 hrs.

We claim:

1. Rigid multi-layer sheet comprising an inner gas and moisture barrier layer, juxtaposed glue layers on each side of said barrier layer and outer layers of a rigid high density polyolefin, said outer layers being formed from said rigid high density polyolefin having an ASTM D–790 flexural modulus of at least 150,000 psi and a combined thickness of at least 20 mils, said gas and moisture barrier layer comprising a copolymer of vinylidene chloride and a remainder of one or more olefinically un-saturated monomers copolymerized therewith and having a thickness of from 0.5 mils to 35 mils, said glue layers comprising a copolymer of ethylene and vinyl acetate and having a thickness of from 0.2 mils to 5 mils, said sheet having a total thickness of more than 20 mils, said rigid multi-layer sheet adapted for thermoforming into a rigid container or containers for packaging food products, said container or containers capable of withstanding hot filled temperatures without substantial collapse failure.

2. The rigid multi-layer sheet of claim 6 wherein each of said outer layers is at least 10 mils thick.

3. The rigid multi-layer sheet of claim 1 wherein the outer layers comprise a high density polyethylene.

4. The rigid multi-layer sheet of claim 1 wherein said copolymer of ethylene and vinyl acetate is blended with an adhesive material selected from a group consisting of a block copolymer of styrene and butadiene, a copolymer of ethylene and ethylacrylate, a copolymer of ethylene and isobutyl acrylate and a polymer of chlorinated polyethylene.

5. Rigid multi-layer sheet comprising an inner gas and moisture barrier layer, juxtaposed glue layers on each side of said barrier layer and outer layers of a rigid high density polyolefin, said outer layers being formed from said rigid high density polyolefin having an ASTM D–790 flexural modulus of at least 150,000 psi and a combined thickness of at least 20 mils, said gas and moisture barrier layer comprising a copolymer of vinylidene chloride and a remainder of one or more olefinically unsaturated monomers copolymerized therewith and having a thickness of from 0.5 mils to 35 mils, said glue layers comprising a copolymer of ethylene and ethylacrylate and having a thickness of from 0.2 mils to 5 mils, said sheet having a total thickness of more than 20 mils, said rigid multi-layer sheet adapted for thermoforming into a rigid container or containers for packaging food products, said container or containers capable of withstanding hot filled temperatures without substantial collapse failure.

6. The rigid multi-layer sheet of claim 5 wherein each of said outer layers is at least 10 mils thick.

7. The rigid multi-layer sheet of claim 5 wherein the outer layers comprise a high density polyethylene.

8. The rigid multi-layer sheet of claim 5 wherein said copolymer of ethylene and ethylacrylate is blended with an adhesive material selected from a group consisting of a block copolymer of styrene and butadiene, a copolymer of ethylene and isobutyl acrylate and a polymer of chlorinated polyethylene.

9. Rigid multi-layer sheet comprising an inner gas and moisture barrier layer, juxtaposed glue layers on each side of said barrier layer and outer layers of a rigid high density polyolefin, said outer layers being formed from said rigid high density polyolefin having an ASTM D–790 flexural modulus of at least 150,000 psi and a combined thickness of at least 20 mils, said gas and moisture barrier layer comprising a copolymer of vinylidene chloride and a remainder of one or more olefinically unsaturated monomers copolymerized therewith and having a thickness of from 0.5 mils to 35 mils, said glue layers comprising a copolymer of ethylene and isobutyl acrylate and having a thickness of from 0.2 mils to 5 mils, said sheet having a total thickness of more than 20 mils, said rigid multi-layer sheet adapted for thermoforming into a rigid container or containers for packaging food products, said container or containers capable of withstanding hot filled temperatures without substantial collapse failure.

10. The rigid multi-layer sheet of claim 9 wherein each of said outer layers is at least 10 mils thick.

11. The rigid multi-layer sheet of claim 9 wherein the outer layers comprise a high density polyethylene.

12. The rigid multi-layer sheet of claim 9 wherein said copolymer of ethylene and isobutyl acrylate is blended with an adhesive material selected from a group consisting of a block copolymer of styrene and butadiene and a polymer of chlorinated polyethylene.

13. Rigid multi-layer sheet comprising an inner gas and moisture barrier layer, juxtaposed glue layers on each side of said barrier layer and outer layers of a rigid high density polyolefin, said outer layers being formed from said rigid high density polyolefins having an ASTM D–790 flexural modulus of at least 150,000 psi and a combined thickness of at least 20 mils, said gas and moisture barrier layer comprising a copolymer of vinylidene chloride and a remainder of one or more olefinically unsaturated monomers copolymerized therewith and having a thickness of from 0.5 mils to 35 mils, said glue layers comprising a polymer of chlorinated polyethylene and having a thickness of from 0.2 mils to 5 mils, said sheet having a total thickness of more than 20 mils, said rigid multi-layer sheet adapted for thermoforming into a rigid container or containers for packaging food products, said container or containers capable of withstanding hot filled temperatures without substantial collapse failure.

14. The rigid multi-layer sheet of claim 13 wherein each of said outer layers is at least 10 mils thick.

15. The rigid multi-layer sheet of claim 13 wherein the outer layers comprise a high density polyethylene.

16. The rigid multi-layer sheet of claim 13 wherein said polymer of chlorinated polyethylene is blended with a block copolymer of styrene and butadiene.

* * * * *